United States Patent
Beerling et al.

(10) Patent No.: US 9,709,426 B2
(45) Date of Patent: Jul. 18, 2017

(54) MAGNETIC-INDUCTIVE FLOWMETER

(71) Applicant: Krohne AG, Basel (CH)

(72) Inventors: Freek Beerling, Breda (NL); Alexander Marnix Heijnsdijk, Papendrecht (NL); Josef Neven, Mours St. Eusebe (FR); Christian Nicolas, Chatuzange le Goubet (FR)

(73) Assignee: Krohne AG, Basel (CH)

( * ) Notice: Subject to any disclaimer, the term of this patent is extended or adjusted under 35 U.S.C. 154(b) by 0 days.

(21) Appl. No.: 14/963,578

(22) Filed: Dec. 9, 2015

(65) Prior Publication Data

US 2016/0202096 A1    Jul. 14, 2016

(30) Foreign Application Priority Data

Jan. 14, 2015  (DE) .................. 10 2015 000 110
Oct. 1, 2015   (DE) .................. 10 2015 116 674

(51) Int. Cl.
*G01F 1/58*      (2006.01)
*G01F 15/14*     (2006.01)

(52) U.S. Cl.
CPC .............. *G01F 1/584* (2013.01); *G01F 1/586* (2013.01); *G01F 15/14* (2013.01)

(58) Field of Classification Search
CPC ....................................................... G01F 1/58
USPC ........................................ 73/861.11, 861.12
See application file for complete search history.

(56) References Cited

U.S. PATENT DOCUMENTS

| | | |
|---|---|---|
| 4,195,515 A | 4/1980 | Smoll |
| 4,517,846 A * | 5/1985 | Harrison ................. G01F 1/584 73/861.12 |
| 5,325,728 A | 7/1994 | Zimmerman et al. |
| 5,503,026 A * | 4/1996 | Bohm ..................... G01F 1/002 73/861.11 |
| 6,092,428 A | 7/2000 | Brockhaus |
| 6,453,754 B1 | 9/2002 | Florin |
| 6,564,612 B2 | 5/2003 | Brockhaus |
| 6,804,613 B2 | 10/2004 | Ishikawa et al. |
| 7,261,001 B2 * | 8/2007 | Heijnsdijk ................ G01F 1/58 73/861.12 |
| 7,971,493 B2 | 7/2011 | Hencken et al. |
| 8,286,502 B2 | 10/2012 | Pelayo |
| 8,322,229 B2 * | 12/2012 | Iijima ..................... G01F 1/584 73/861.12 |
| 2012/0066301 A1 | 3/2012 | Holland |
| 2015/0300861 A1 | 10/2015 | Regen et al. |
| 2015/0316399 A1 * | 11/2015 | Graf ....................... G01F 1/588 73/861.12 |

FOREIGN PATENT DOCUMENTS

DE  692 32 633 T2  9/2002
EP   0 704 682 A2   4/1996

* cited by examiner

*Primary Examiner* — Jewel V Thompson
(74) *Attorney, Agent, or Firm* — David S. Safran

(57) ABSTRACT

A magnetic-inductive flowmeter for measuring flow of a flowing medium, having a measuring tube, a magnetic field generator, at least one measuring electrode and a measuring section that is flat on one side having a planar measuring tube portion. Furthermore, the magnetic field generator has at least one coil core and a pole shoe. The magnetic-inductive flowmeter is improved compared to the prior art by several support lugs being present between the planar measuring tube portion and the pole shoe.

7 Claims, 2 Drawing Sheets

MAGNETIC-INDUCTIVE FLOWMETER

BACKGROUND OF THE INVENTION

Field of the Invention

The invention relates to a magnetic-inductive flowmeter for measuring flow of a flowing medium, having a measuring tube, having a magnetic field generator for generating a magnetic field at least partially interfusing the measuring tube, and having at least one measuring electrode for tapping a measuring voltage induced in the flowing medium, wherein the measuring tube has a central measuring section including the measuring electrodes that is flat on one side having a planar measuring tube portion, called portion in the following, and wherein at least one coil core and one pole shoe belong to the magnetic field generator.

Description of Related Art

According to Faraday's law of induction, an electric field strength is formed perpendicular to the direction of flow of the medium and perpendicular to the magnetic field in a flowing, electrically conductive medium interfused by a magnetic field. Faraday's law of induction is thus exploited in magnetic-inductive flowmeters in that a magnetic field usually fluctuating over time during the measurement process is generated by means of a magnetic field generator usually having at least one magnetic field coil, and that the magnetic field at least partially interfuses the electrically conductive medium flowing through the measuring tube. Here, the generated magnetic field has at least one component perpendicular to the longitudinal axis of the measuring tube or perpendicular to the direction of flow of the medium.

If the magnetic-inductive flowmeter being discussed here has at least one magnetic field generator "for generating a magnetic field running perpendicular to the longitudinal axis of the measuring tube", then the magnetic field preferably runs perpendicular to the longitudinal axis of the measuring tube or perpendicular to the direction of flow of the medium, however, it is sufficient when a component of the magnetic field runs perpendicular to the longitudinal axis of the measuring tube or perpendicular to the direction of flow of the medium.

It is also described above that the magnetic field generator is used for generating a preferably alternating magnetic field. This expresses that it is not of importance for the teaching of the invention that this is an alternating magnetic field, i.e., an alternating electromagnetic field. However, it is to be pointed out that magnetic-inductive flowmeters predominantly have magnetic field generators for generating alternating magnetic fields.

It is also described above that the magnetic-inductive flowmeter being discussed here also has at least one measuring electrode for tapping a measuring voltage induced in a flowing medium, often, two electrodes are present. Preferably, the measuring electrodes come into contact with the medium. Preferably, the virtual connection line of the two measuring electrodes runs at least essentially perpendicular to the direction of the magnetic field interfusing the measuring tube perpendicular to the longitudinal axis of the measuring tube. In particular, the measuring electrodes can be provided in such a manner that their virtual connection line actually runs—more or less—perpendicular to the direction of the magnetic field interfusing the measuring tube.

It has already been described above that the measuring electrodes are, in particular, such that they come into contact with the medium. Indeed, of course, the electric field strength generated by induction in the flowing, electrically conductive medium can be tapped by measuring electrodes having direct, i.e., galvanic contact with the medium as a measuring voltage. However, there are magnetic-inductive flowmeters in which the measuring voltage is not tapped by measuring electrodes having direct, i.e., galvanic contact with the medium, rather the measuring voltage is capacitively determined.

Magnetic-inductive flowmeters known from the prior art in German Patent DE 692 32 633 C2, DE 199 07 864 A1 and corresponding U.S. Pat. No. 6,453,754 B1, German Patent DE 100 64 738 B4 and corresponding U.S. Pat. No. 6,564,612 B2, DE 102 43 748 A1 and corresponding U.S. Pat. No. 6,804,613 B2, German Patent Application DE 10 2008 005 258 A1 and corresponding U.S. Pat. No. 7,971,493 B2 and German Patent Application DE 10 2011 112 703 A1 and corresponding U.S. Patent Application 2012/0066301 A1 as well as European Patent Applications EP 0 704 682 A1 and EP 0 834 057 A1 and corresponding U.S. Pat. No. 6,092,428 are referred to as examples. Reference is made, in particular, to German Patent Application DE 10 2008 057 756 A1 and corresponding U.S. Pat. No. 8,286,502 B2, from which the magnetic-inductive flowmeter described in the introduction is known. The measuring tube in this known magnetic-inductive flowmeter has a cross-section that changes over its length and the cross-section in the central section of the measuring tube, called measuring section above, is less than at the beginning of the measuring tube and the end of the measuring tube. Thereby, the cross-section of the measuring tube in its central section, i.e., in the measuring section, is rectangular, or optionally square.

On the other hand, the invention is based on a magnetic-inductive flowmeter, in which the measuring section of the measuring tube necessarily has only a planar measuring tube portion, called portion above. Namely, the measuring section in magnetic-inductive flowmeters according to the invention can have two or more planar portions, it only being important for the following teaching of the invention that one planar measuring tube portion is sufficient.

The known magnetic-inductive flowmeters are often a "sturdy construction" in that the measuring tube and/or the measuring device housing is formed of metal. As a general rule, these measuring tubes are tubes, i.e., cylindrical hollow bodies having a circular cross section. The measuring device housings are also often designed as cylindrical hollow bodies with a circular cross section or an essentially circular cross section. Further, it holds true for most known magnetic-inductive flowmeters that the measuring device housings have end flanges and connection flanges formed of metal on both sides. On the one hand, these flanges, with which the two ends of the measuring tube are—directly or indirectly—connected, terminate the flowmeter, leading to the term "end flange". On the other hand, the flanges are used for connection of both sides of the flowmeter to the corresponding piping flanges, thus "connection flange".

Among many other things and above all, magnetic-inductive flowmeters have to meet substantial requirements for measuring accuracy. It is to be taken into consideration here that the measuring voltage induced in the flowing, electrically conductive medium is relatively low. This holds true for "normal conditions". "Normal conditions" are understood as a flow velocity that is not particularly low and a conductivity of the flowing medium that is not particularly low. In the case of "complicated conditions" in terms of measuring, i.e., low flow velocity and/or low electric conductivity of the flowing medium, particularly low measuring voltages are induced, with the consequence that relatively low—in absolute terms—interfering voltages significantly influence the measuring accuracy.

The result hereby is that a strong as possible magnetic field should be generated in the measuring tube so that, preferably, also all attenuations are reduced as much as possible. This implies that, e.g., in the prior art, the wall thickness in the measuring section is chosen to be as small as possible.

In an implementation of the magnetic-inductive flowmeter known from German Patent Application DE 10 2008 057 756 A1 and corresponding U.S. Pat. No. 8,286,502 B2, the wall thickness of the measuring tube in the measuring section is less than at the beginning and the end of the measuring tube. Due to the capacity of the measuring tube to withstand pressure, at least one reinforcement connecting the measuring tube to the measuring device housing is provided in the area of the measuring section.

It is stated above that known magnetic-inductive flowmeters are often overall of a "sturdy construction" in that the measuring tube and/or the measuring device housing consist/s of metal. Increased stability can be necessary—even with a metallic measuring tube—when a high pressure load exists. However, it can be appropriate to produce the measuring tube and optionally also the measuring device housing of a material that is relatively less durable—and thus less expensive—, in particular of relatively inexpensive plastic.

The necessity for an increased stability can thus result, on the one hand, due to the use—i.e., the prevailing pressure. On the other hand, this may be due to the choice of material—e.g., plastic.

This goes hand in hand with another conflict of interests: On the one hand, the measuring tube, even in the area of the measuring section, has to have a considerable thickness in a magnetic-inductive flowmeter, whose measuring tube is formed of a relatively less durable plastic. Such a thickness is also then necessary when the measuring tube is formed of metal, but high pressure is able to arise in the measuring tube. On the other hand, the magnetic field generator should generate a relatively strong and extensively homogenous magnetic field in the measuring tube. In the prior art, for example, this leads to the measuring tube being implemented with a measuring section that is flat on one side with a planar measuring tube portion, in the following always just called portion, and the measuring tube only has a relatively thin thickness in the area of the portion.

What is described above leads to the magnetic field generator being able to generate a relatively strong and extensively homogenous magnetic field in the measuring tube because the pole shoe can be arranged directly and flat against the planar portion and thus close to the inside of the measuring tube.

SUMMARY OF THE INVENTION

The primary object of the invention is to provide a magnetic-inductive flowmeter that is improved as compared to the prior art.

The magnetic-inductive flowmeter according to the invention in which the above derived and described object is achieved is initially and essentially wherein several, preferably three or four, support lugs are implemented between the measuring tube portion, just called portion in the following, and the pole shoe.

If the portion is designed to be relatively thin in order to attenuate the generated magnetic field as little as possible, or optionally if high pressure arises in the measuring tube, then measures or otherwise appropriate reactions should be taken to prevent the portion from buckling outward. Buckling would unintentionally and undesirably change the position and alignment of the portion. The support lugs provided according to the invention define the plane determining the location and alignment of the pole shoe better than a large area is able to do.

Preferably, the support lugs are located where the smallest amount of movement or possibly not even any movement is to be anticipated due to the pressure in the measuring tube, so that the pole shoe is correspondingly positioned to be still and experiences no or very little positional change.

Thereby, the support lugs, the pole shoe and the portion are designed and coordinated so that the pole shoe is as close as possible to the measuring tube and is aligned as optimally as possible for generating the magnetic field.

In one design, it is provided that the support lugs belong to the pole shoe and/or the portion. This association thereby results due to the fixing and/or the design as part of the pole shoe or the portion. The support lugs are all assigned either to the pole shoe or to the portion. Alternatively, a fraction of the support lugs is assigned to the pole shoe and the rest are assigned to the portion. Thereby, the support lugs can be formed, in each case, directly on the pole shoe or the portion and can be accordingly attached there.

In a further variation, the support lugs are separate components that are positioned between the pole shoe and the portion and are possibly at least attached to the pole shoe or the portion.

In a particularly preferred implementation of the magnetic-inductive flowmeter according to the invention, the pole shoe is formed of several pole shoe parts.

In an alternative design, the pole shoe is one piece.

In one design, the pole shoe rests on the support lugs, i.e., is supported solely by the support lugs. In one design, the pole shoe has no further contact to the portion and is supported solely by the support lugs.

In one implementation, the support lugs span a geometric form on the portion, which essentially corresponds to a surface that covers the pole shoe on the portion. In one design, the support lugs are located in the area of the corners of the surface that covers the pole shoe on the portion. Thus, the covered surface on the portion—as a projection of the pole shoe on the portion—is, for example, a rectangle, thus, one support lug is preferably located in each area of the four corners, confining the rectangle.

In a further design, the pole shoe is arranged along a longitudinal axis of the measuring tube, between two stop elements. This design is supplemented in another design, in that the pole shoe includes the two stop elements, at least in part. In one design, each pole shoe has a recess on its end face, into which a respective stop element partially extends.

In one implementation, the pole shoe and/or the coil core are produced at least in part using the MIM (metal inspection molding) method.

As described in detail above, there are various possibilities for designing and further developing the magnetic-inductive flowmeter according to the invention as will become apparent from the following description in conjunction with the accompanying drawings.

DETAILED DESCRIPTION OF THE INVENTION

Figure 1:
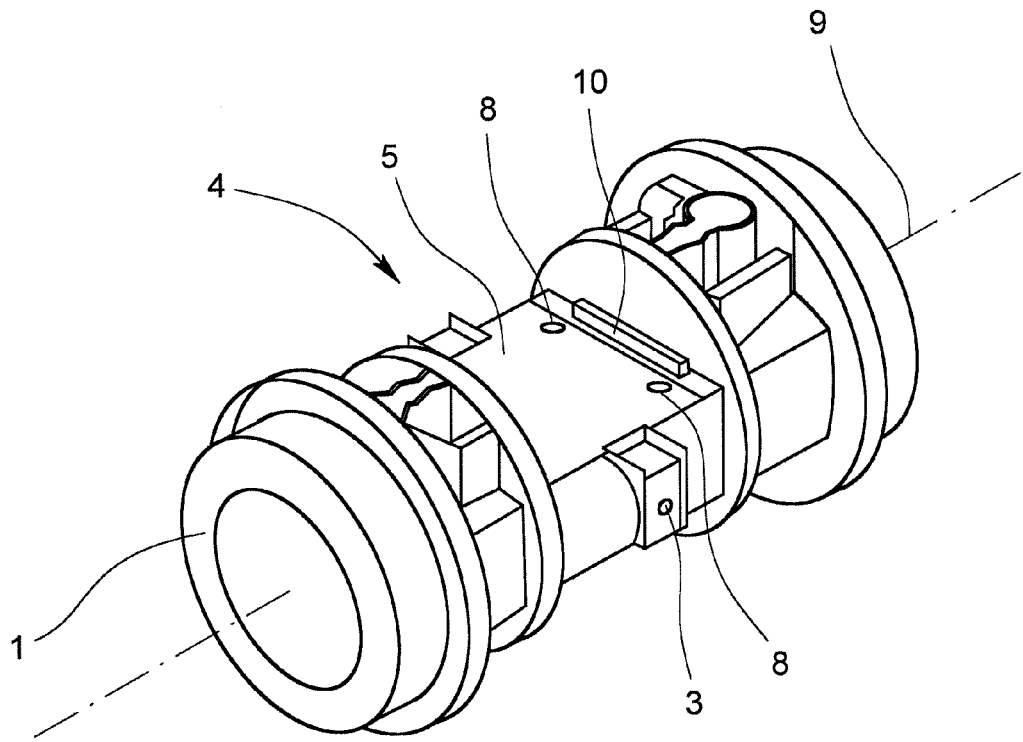
FIG. 1 is a perspective view of a measuring tube of a magnetic-inductive flowmeter.

As stated above, a measuring tube 1 with medium flowing through it, whose flow is to be measured, a magnetic field generator 2,—only shown in part here—for generating a magnetic field at least partially interfusing the measuring tube 1, and—in the illustrated embodiment—two measuring electrodes 3 for tapping a measuring voltage induced in the flowing medium belong to magnetic-inductive flowmeters. In general an evaluation unit and a measuring device are present in such flowmeters.

In the magnetic-inductive flowmeters according to the invention, the measuring tube 1 has a central measuring section 4, which is flat on one side and includes the measuring electrodes 3, having a planar measuring tube portion, always called portion 5 in the following. A magnetic coil,—not shown here for clarity—a coil core 6, and at least one pole shoe 7 belong to the magnetic field generator 2 that is only implied.

The measuring tube 1 here is formed of plastic, as an example. Taking the pressure into consideration that can prevail in the measuring tube 1, the measuring tube 1, even in the measuring section 4, needs to have a certain pressure resistance. For this reason, the different sections of the measuring tube 1 generally have a relatively large thickness. This, however, does not hold true for the portion 5 of the illustrated embodiment. That is, portion 5 is relatively thin, so that the magnetic field to be generated is hardly attenuated at all.

This can result in the measuring tube 1—at a correspondingly high pressure—buckling outward. Thus, a portion 5 is present that is not flat or planar, though this is actually necessary. This also means that the distance to the pole shoe 7 can differ, which, in turn, negatively affects the generated magnetic field.

Thus, according to the invention, the pole shoe 7 is not applied directly on the portion 5, rather is supported on the portion 5 by several support lugs 8—in the variation suggested in FIG. 1, by four, almost cylindrical support lugs 8.

Thereby, the support lugs 8 are preferably positioned where increased pressure in the measuring tube 1 affects the portion 5 as little as possible, i.e., for example, at the edge of the portion 5. The optimum position thereby depends on the characteristics of the measuring tube 1 and also the form of the pole shoe 7.

Figure 2:
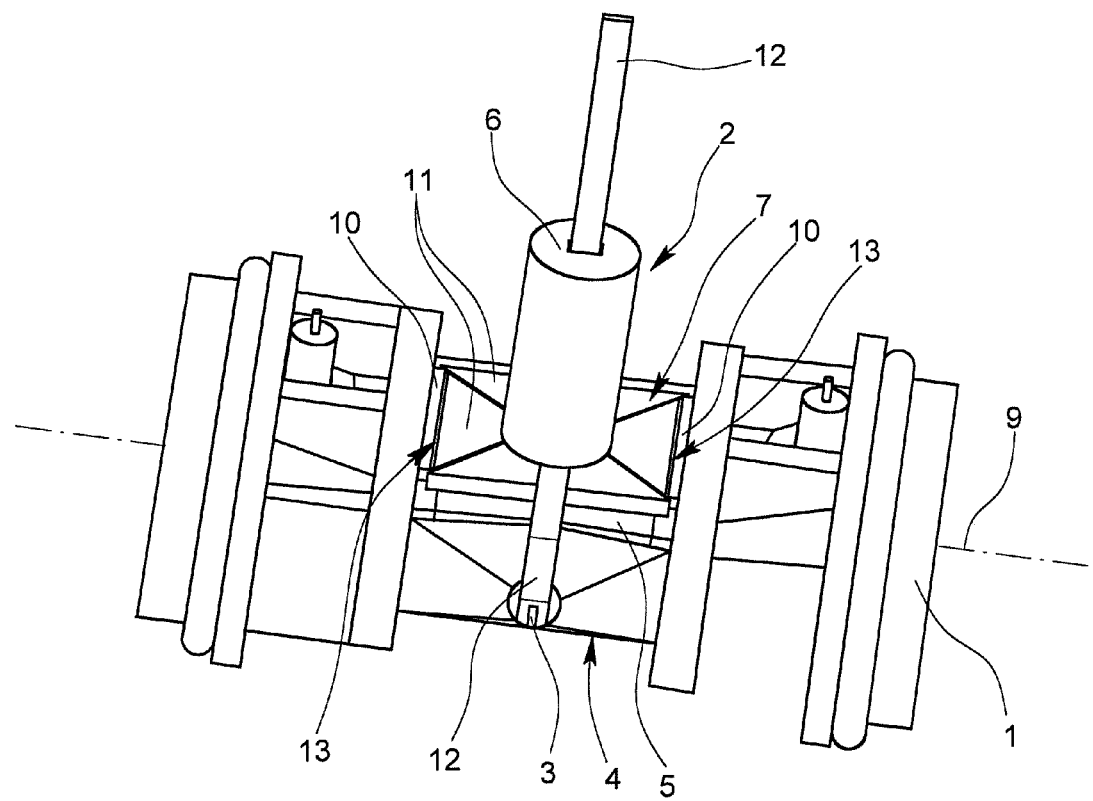
FIG. 2 is a perspective view of a measuring tube of the magnetic-inductive flowmeter with a part of the functionally-required magnetic field generator.

As is made clear by a comparison of FIGS. 1 & 2, the four support lugs 8 define the surface on the portion 5 that is covered by the pole shoe 7, namely a rectangle.

In the illustrated embodiments, the pole shoe 7, as seen in FIG. 2, is formed of several pole shoe parts 11, as an example there are four here.

As can be taken from FIG. 1, two stop elements 10 are located opposite one another on the portion 5 along the longitudinal axis 9 of the measuring tube 1, and thus, also along the direction of flow of the medium. The stop elements 10 are designed here essentially as cylinders having a rectangular base, and which are oriented with their longitudinal axis essentially perpendicular to the longitudinal axis 9 of the measuring tube 1.

FIG. 2 makes clear that the pole shoe 7 or, respectively, its four pole shoe parts 11, are arranged between the two stop elements 10. For this, the pole shoe parts 11 or, respectively, the pole shoe 7, itself, has two recesses 13, which partially position themselves around the stop elements 10.

Furthermore, FIG. 2 shows the distinctive feature that measuring electrode 3 contacts a conductor 12, which, in particular, is designed here as a flexible board and is guided from the measuring electrode 3 through the coil core 6. For this, the coil core 6 has a pass-through recess and there is also a passage to the recess between the pole shoe 7 and the coil core 6, so that the conductor 12 can be guided through it.

What is claimed is:

1. Magnetic-inductive flowmeter for measuring flow of a flowing medium, comprising:
   a measuring tube,
   a magnetic field generator for generating a magnetic field at least partially interfusing the measuring tube, the magnetic field generator having at least one coil core and one pole shoe,
   at least one measuring electrode for tapping a measuring voltage induced in the flowing medium,
   wherein the measuring tube has a central measuring section including the measuring electrodes that is flat on one side having a planar measuring tube portion, and,
   wherein several support lugs are present between the planar measuring tube portion and the pole shoe and support the pole shoe spaced from the planar measuring tube portion.

2. Magnetic-inductive flowmeter according to claim 1, wherein the support lugs are part of at least one of the pole shoe and to the planar measuring tube portion.

3. Magnetic-inductive flowmeter according to claim 1, wherein the pole shoe is formed of one or several pole shoe parts.

4. Magnetic-inductive flowmeter according to claim 1, wherein the pole shoe rests on the support lugs.

5. Magnetic-inductive flowmeter according to claim 1, wherein the support lugs are located near corners of the planar measuring tube portion.

6. Magnetic-inductive flowmeter according to claim 1, wherein two stop elements are provided at opposite ends of the planar measuring tube portion and wherein the pole shoe is arranged along a longitudinal axis of the measuring tube between the two stop elements.

7. Magnetic-inductive flowmeter according to claim 6, wherein the pole shoe has a recess at each of opposite sides thereof into which a respective one of the two stop elements is partially received.

* * * * *